(12) United States Patent
Ho et al.

(10) Patent No.: US 11,145,262 B2
(45) Date of Patent: Oct. 12, 2021

(54) ELECTRO-OPTIC DISPLAYS

(71) Applicant: E Ink Corporation, Billerica, MA (US)

(72) Inventors: Chih-Hsiang Ho, Andover, MA (US); Yi Lu, Needham, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 16/678,323

(22) Filed: Nov. 8, 2019

(65) Prior Publication Data

US 2020/0152140 A1     May 14, 2020

Related U.S. Application Data (60) Provisional application No. 62/757,818, filed on Nov. 9, 2018.

(51) Int. Cl.
    *G09G 3/34*       (2006.01)
    *G02F 1/1362*     (2006.01)
    *G02F 1/167*      (2019.01)

(52) U.S. Cl.
    CPC ..... *G09G 3/3446* (2013.01); *G02F 1/136213* (2013.01); *G02F 1/136286* (2013.01); *G02F 1/167* (2013.01); *G02F 2201/123* (2013.01)

(58) Field of Classification Search
    CPC ............ G09G 3/3446; G02F 1/136213; G02F 1/136286; G02F 1/167; G02F 2201/123
    See application file for complete search history.

(56) References Cited

U.S. PATENT DOCUMENTS

| | | | |
|---|---|---|---|
| 6,124,851 | A | 9/2000 | Jacobson |
| 6,130,773 | A | 10/2000 | Jacobson et al. |
| 6,177,921 | B1 | 1/2001 | Comiskey et al. |
| 6,232,950 | B1 | 5/2001 | Albert et al. |
| 6,241,921 | B1 | 6/2001 | Jacobson et al. |
| 6,252,564 | B1 | 6/2001 | Albert et al. |
| 6,312,304 | B1 | 11/2001 | Duthaler et al. |
| 6,312,971 | B1 | 11/2001 | Amundson et al. |
| 6,376,828 | B1 | 4/2002 | Comiskey |
| 6,392,786 | B1 | 5/2002 | Albert |

(Continued)

FOREIGN PATENT DOCUMENTS

| | | |
|---|---|---|
| CN | 104020881 A | 9/2014 |
| CN | 104280969 A | 1/2015 |

(Continued)

OTHER PUBLICATIONS

Korean Intellectual Property Office, PCT/US2019/060470, International Search Report and Written Opinion, dated Apr. 9, 2020.

*Primary Examiner* — Kenneth B Lee, Jr.
(74) *Attorney, Agent, or Firm* — Jason P. Colangelo; Zhen Bao (57) ABSTRACT

An apparatus for driving an electro-optic display may comprise spaced first and second device layers, and a first and second rows of display pixels, each row may include a plurality of display pixels, each display pixel having a pixel electrode positioned on the first device layer for driving the display pixel, a conduction line positioned on the second device layer and overlapping with a portion of the plurality of display pixels' pixel electrodes, and at least one conductive path connecting the conduction line of the first row to a conduction line of the second row of display pixels.

12 Claims, 6 Drawing Sheets

(56) References Cited

U.S. PATENT DOCUMENTS

| | | |
|---|---|---|
| 6,413,790 B1 | 7/2002 | Duthaler et al. |
| 6,422,687 B1 | 7/2002 | Jacobson |
| 6,445,374 B2 | 9/2002 | Albert et al. |
| 6,480,182 B2 | 11/2002 | Turner et al. |
| 6,498,114 B1 | 12/2002 | Amundson et al. |
| 6,506,438 B2 | 1/2003 | Duthaler et al. |
| 6,518,949 B2 | 2/2003 | Drzaic |
| 6,521,489 B2 | 2/2003 | Duthaler et al. |
| 6,535,197 B1 | 3/2003 | Comiskey et al. |
| 6,545,291 B1 | 4/2003 | Amundson et al. |
| 6,639,578 B1 | 10/2003 | Comiskey et al. |
| 6,657,772 B2 | 12/2003 | Loxley |
| 6,664,944 B1 | 12/2003 | Albert et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,724,519 B1 | 4/2004 | Morrison et al. |
| 6,750,473 B2 | 6/2004 | Amundson et al. |
| 6,788,449 B2 | 9/2004 | Liang et al. |
| 6,816,147 B2 | 11/2004 | Albert |
| 6,819,471 B2 | 11/2004 | Amundson et al. |
| 6,825,068 B2 | 11/2004 | Denis et al. |
| 6,831,769 B2 | 12/2004 | Holman et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,865,010 B2 | 3/2005 | Duthaler et al. |
| 6,866,760 B2 | 3/2005 | Paolini, Jr. et al. |
| 6,873,452 B2 | 3/2005 | Tseng et al. |
| 6,909,532 B2 | 6/2005 | Chung et al. |
| 6,922,276 B2 | 7/2005 | Zhang et al. |
| 6,967,640 B2 | 11/2005 | Albert et al. |
| 6,980,196 B1 | 12/2005 | Turner et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,030,412 B1 | 4/2006 | Drzaic et al. |
| 7,072,095 B2 | 7/2006 | Liang et al. |
| 7,075,502 B1 | 7/2006 | Drzaic et al. |
| 7,075,703 B2 | 7/2006 | O'Neil et al. |
| 7,106,296 B1 | 9/2006 | Jacobson |
| 7,110,163 B2 | 9/2006 | Webber et al. |
| 7,116,318 B2 | 10/2006 | Amundson et al. |
| 7,144,942 B2 | 12/2006 | Zang et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,190,008 B2 | 3/2007 | Amundson et al. |
| 7,206,119 B2 | 4/2007 | Honeyman et al. |
| 7,223,672 B2 | 5/2007 | Kazlas et al. |
| 7,230,751 B2 | 6/2007 | Whitesides et al. |
| 7,256,766 B2 | 8/2007 | Albert et al. |
| 7,259,744 B2 | 8/2007 | Arango et al. |
| 7,280,094 B2 | 10/2007 | Albert |
| 7,301,693 B2 | 11/2007 | Chaug et al. |
| 7,304,780 B2 | 12/2007 | Liu et al. |
| 7,312,784 B2 | 12/2007 | Baucom et al. |
| 7,327,346 B2 | 2/2008 | Chung et al. |
| 7,327,511 B2 | 2/2008 | Whitesides et al. |
| 7,347,957 B2 | 3/2008 | Wu et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,382,363 B2 | 6/2008 | Albert et al. |
| 7,388,572 B2 | 6/2008 | Duthaler et al. |
| 7,401,758 B2 | 7/2008 | Liang et al. |
| 7,411,719 B2 | 8/2008 | Paolini, Jr. et al. |
| 7,442,587 B2 | 10/2008 | Amundson et al. |
| 7,453,445 B2 | 11/2008 | Amundson |
| 7,492,497 B2 | 2/2009 | Paolini, Jr. et al. |
| 7,535,624 B2 | 5/2009 | Amundson et al. |
| 7,551,346 B2 | 6/2009 | Fazel et al. |
| 7,554,712 B2 | 6/2009 | Patry et al. |
| 7,560,004 B2 | 7/2009 | Pereira et al. |
| 7,583,427 B2 | 9/2009 | Danner et al. |
| 7,598,173 B2 | 10/2009 | Ritenour et al. |
| 7,605,799 B2 | 10/2009 | Amundson et al. |
| 7,636,191 B2 | 12/2009 | Duthaler |
| 7,649,674 B2 | 1/2010 | Danner et al. |
| 7,667,886 B2 | 2/2010 | Danner et al. |
| 7,672,040 B2 | 3/2010 | Sohn et al. |
| 7,679,814 B2 | 3/2010 | Paolini, Jr. et al. |
| 7,688,497 B2 | 3/2010 | Danner et al. |
| 7,715,088 B2 | 5/2010 | Liang et al. |
| 7,733,335 B2 | 6/2010 | Zehner et al. |
| 7,785,988 B2 | 8/2010 | Amundson et al. |
| 7,830,592 B1 | 11/2010 | Sprague et al. |
| 7,839,564 B2 | 11/2010 | Whitesides et al. |
| 7,843,626 B2 | 11/2010 | Amundson et al. |
| 7,859,637 B2 | 12/2010 | Amundson et al. |
| 7,880,958 B2 | 2/2011 | Zang et al. |
| 7,893,435 B2 | 2/2011 | Kazlas et al. |
| 7,898,717 B2 | 3/2011 | Patry et al. |
| 7,905,977 B2 | 3/2011 | Qi et al. |
| 7,957,053 B2 | 6/2011 | Honeyman et al. |
| 7,986,450 B2 | 7/2011 | Cao et al. |
| 8,009,344 B2 | 8/2011 | Danner et al. |
| 8,009,348 B2 | 8/2011 | Zehner et al. |
| 8,018,428 B2 | 9/2011 | Jung et al. |
| 8,027,081 B2 | 9/2011 | Danner et al. |
| 8,049,947 B2 | 11/2011 | Danner et al. |
| 8,072,675 B2 | 12/2011 | Lin et al. |
| 8,077,141 B2 | 12/2011 | Duthaler et al. |
| 8,089,453 B2 | 1/2012 | Comiskey et al. |
| 8,115,205 B2 | 2/2012 | Lee et al. |
| 8,120,836 B2 | 2/2012 | Lin et al. |
| 8,159,636 B2 | 4/2012 | Sun et al. |
| 8,208,193 B2 | 6/2012 | Patry et al. |
| 8,237,892 B1 | 8/2012 | Sprague et al. |
| 8,238,021 B2 | 8/2012 | Sprague et al. |
| 8,264,454 B2 | 9/2012 | Kim et al. |
| 8,362,488 B2 | 1/2013 | Chaug et al. |
| 8,373,211 B2 | 2/2013 | Amundson et al. |
| 8,389,381 B2 | 3/2013 | Amundson et al. |
| 8,395,836 B2 | 3/2013 | Lin |
| 8,437,069 B2 | 5/2013 | Lin |
| 8,441,414 B2 | 5/2013 | Lin |
| 8,456,589 B1 | 6/2013 | Sprague et al. |
| 8,498,042 B2 | 7/2013 | Danner |
| 8,514,168 B2 | 8/2013 | Chung et al. |
| 8,547,628 B2 | 10/2013 | Wu et al. |
| 8,576,162 B2 | 11/2013 | Kang et al. |
| 8,610,988 B2 | 12/2013 | Zehner et al. |
| 8,614,654 B2 * | 12/2013 | Lee .................. G09G 3/3677 345/58 |
| 8,714,780 B2 | 5/2014 | Ho et al. |
| 8,728,266 B2 | 5/2014 | Danner et al. |
| 8,743,077 B1 | 6/2014 | Sprague |
| 8,773,398 B2 | 7/2014 | Funo et al. |
| 8,797,258 B2 | 8/2014 | Sprague |
| 8,797,633 B1 | 8/2014 | Sprague et al. |
| 8,797,636 B2 | 8/2014 | Yang et al. |
| 8,830,560 B2 | 9/2014 | Danner et al. |
| 8,891,155 B2 | 11/2014 | Danner et al. |
| 8,969,886 B2 | 3/2015 | Amundson |
| 9,025,234 B2 | 5/2015 | Lin |
| 9,025,238 B2 | 5/2015 | Chan et al. |
| 9,030,374 B2 | 5/2015 | Sprague et al. |
| 9,140,952 B2 | 9/2015 | Sprague et al. |
| 9,147,364 B2 | 9/2015 | Wu et al. |
| 9,152,003 B2 | 10/2015 | Danner et al. |
| 9,152,004 B2 | 10/2015 | Paolini, Jr. et al. |
| 9,201,279 B2 | 12/2015 | Wu et al. |
| 9,223,164 B2 | 12/2015 | Lai et al. |
| 9,279,906 B2 | 3/2016 | Kang |
| 9,285,648 B2 | 3/2016 | Liu et al. |
| 9,310,661 B2 | 4/2016 | Wu et al. |
| 9,335,870 B2 | 5/2016 | Yousefpor et al. |
| 9,406,266 B2 | 8/2016 | Park et al. |

(56) References Cited

U.S. PATENT DOCUMENTS

| | | |
|---|---|---|
| 9,419,024 B2 | 8/2016 | Ritenour et al. |
| 9,454,057 B2 | 9/2016 | Wu et al. |
| 9,529,240 B2 | 12/2016 | Paolini, Jr. et al. |
| 9,582,041 B2 | 2/2017 | Cheng et al. |
| 9,620,066 B2 | 4/2017 | Bishop |
| 9,632,373 B2 | 4/2017 | Huang et al. |
| 9,666,142 B2 | 5/2017 | Hung |
| 9,671,635 B2 | 6/2017 | Paolini, Jr. |
| 9,778,500 B2 | 10/2017 | Gates et al. |
| 9,841,653 B2 | 12/2017 | Wu et al. |
| 10,037,735 B2 | 7/2018 | Amundson |
| 10,048,563 B2 | 8/2018 | Paolini, Jr. et al. |
| 10,048,564 B2 | 8/2018 | Paolini, Jr. et al. |
| 10,190,743 B2 | 1/2019 | Hertel et al. |
| 10,444,553 B2 | 10/2019 | Laxton |
| 2002/0060321 A1 | 5/2002 | Kazlas et al. |
| 2004/0085619 A1 | 5/2004 | Wu et al. |
| 2004/0105036 A1 | 6/2004 | Danner et al. |
| 2005/0122306 A1 | 6/2005 | Wilcox et al. |
| 2005/0122563 A1 | 6/2005 | Honeyman et al. |
| 2006/0255322 A1 | 11/2006 | Wu et al. |
| 2007/0052757 A1 | 3/2007 | Jacobson |
| 2007/0057905 A1 | 3/2007 | Johnson et al. |
| 2009/0122389 A1 | 5/2009 | Whitesides et al. |
| 2009/0315044 A1 | 12/2009 | Amundson et al. |
| 2010/0177396 A1 | 7/2010 | Lin |
| 2011/0140744 A1 | 6/2011 | Kazlas et al. |
| 2011/0187683 A1 | 8/2011 | Wilcox et al. |
| 2011/0292319 A1 | 12/2011 | Cole |
| 2011/0298727 A1* | 12/2011 | Yousefpor ............. G06F 3/0412 345/173 |
| 2012/0218242 A1 | 8/2012 | Ho et al. |
| 2014/0078024 A1 | 3/2014 | Paolini, Jr. et al. |
| 2014/0192000 A1 | 7/2014 | Hung et al. |
| 2014/0210701 A1 | 7/2014 | Wu et al. |
| 2015/0005720 A1 | 1/2015 | Zang |
| 2015/0261057 A1 | 9/2015 | Harris et al. |
| 2015/0378235 A1 | 12/2015 | Lin et al. |
| 2016/0012710 A1 | 1/2016 | Lu et al. |
| 2016/0077375 A1 | 3/2016 | Lin |
| 2016/0103380 A1 | 4/2016 | Kayal et al. |

FOREIGN PATENT DOCUMENTS

| | | |
|---|---|---|
| WO | 1999067678 A2 | 12/1999 |
| WO | 2000005704 A1 | 2/2000 |
| WO | 2000038000 A1 | 6/2000 |

* cited by examiner

ELECTRO-OPTIC DISPLAYS

REFERENCE TO RELATED APPLICATIONS

This application is related to and claims priority to U.S. Provisional Application 62/757,818 filed on Nov. 9, 2018.
The entire disclosures of the aforementioned application is herein incorporated by reference.

SUBJECT OF THE INVENTION

This invention relates to electro-optic display apparatuses, more particularly, to display backplanes that include thin-film transistor arrays.

BACKGROUND OF INVENTION

Particle-based electrophoretic displays have been the subject of intense research and development for a number of years. In such displays, a plurality of charged particles (sometimes referred to as pigment particles) move through a fluid under the influence of an electric field. The electric field is typically provided by a conductive film or a transistor, such as a field-effect transistor. Electrophoretic displays have good brightness and contrast, wide viewing angles, state bistability, and low power consumption when compared with liquid crystal displays. Such electrophoretic displays have slower switching speeds than LCD displays, however, and electrophoretic displays are typically too slow to display real-time video. Additionally, the electrophoretic displays can be sluggish at low temperatures because the viscosity of the fluid limits the movement of the electrophoretic particles. Despite these shortcomings, electrophoretic displays can be found in everyday products such as electronic books (e-readers), mobile phones and mobile phone covers, smart cards, signs, watches, shelf labels, and flash drives.

Many commercial electrophoretic media essentially display only two colors, with a gradient between the black and white extremes, known as "grayscale." Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid. In the latter case, the first color is displayed when the first type of particles lie adjacent the viewing surface of the display and the second color is displayed when the second type of particles lie adjacent the viewing surface). Typically the two colors are black and white.

Although seemingly simple, electrophoretic media and electrophoretic devices display complex behaviors. For instance, it has been discovered that simple "on/off" voltage pulses are insufficient to achieve high-quality text in electronic readers. Rather, complicated "waveforms" are needed to drive the particles between states and to assure that the new displayed text does not retain a memory of the previous text, i.e., a "ghost."

SUMMARY OF INVENTION

This invention provides an electro-optic display having spaced first and second device layers, and a first and second rows of display pixels, each row comprising a plurality of display pixels, each display pixel having an pixel electrode positioned on the first device layer for driving the display pixel, a conduction line positioned on the second device layer and overlapping with a portion of the plurality of display pixels' pixel electrodes; and at least one conductive path connecting the conduction line of the first row to a conduction line of the second row of display pixels.

DETAILED DESCRIPTION

As indicated above, the subject matter presented herein provides methods and means to reduce capacitance couplings and improves electro-optic display performances.

The term "electro-optic" as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published US Patent Application No. 2002/0180687 (see also the corresponding International Application Publication No. WO 02/079869) that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspension medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. D485,294; 6,124,851; 6,130,773; 6,177,921; 6,232,950; 6,252,564; 6,312,304; 6,312,971; 6,376,828; 6,392,786; 6,413,790; 6,422,687; 6,445,374; 6,480,182; 6,498,114; 6,506,438; 6,518,949; 6,521,489; 6,535,197; 6,545,291; 6,639,578; 6,657,772; 6,664,944; 6,680,725; 6,683,333; 6,724,519; 6,750,473; 6,816,147; 6,819,471; 6,825,068; 6,831,769; 6,842,167; 6,842,279; 6,842,657; 6,865,010; 6,873,452; 6,909,532; 6,967,640; 6,980,196; 7,012,735; 7,030,412; 7,075,703; 7,106,296; 7,110,163; 7,116,318; 7,148,128; 7,167,155; 7,173,752; 7,176,880; 7,190,008; 7,206,119; 7,223,672; 7,230,751; 7,256,766; 7,259,744; 7,280,094; 7,301,693; 7,304,780; 7,327,511; 7,347,957; 7,349,148; 7,352,353; 7,365,394; 7,365,733; 7,382,363; 7,388,572; 7,401,758; 7,442,587; 7,492,497; 7,535,624; 7,551,346; 7,554,712; 7,583,427; 7,598,173; 7,605,799; 7,636,191; 7,649,674; 7,667,886; 7,672,040; 7,688,497; 7,733,335; 7,785,988; 7,830,592; 7,843,626; 7,859,637; 7,880,958; 7,893,435; 7,898,717; 7,905,977; 7,957,053; 7,986,450; 8,009,344; 8,027,081; 8,049,947; 8,072,675; 8,077,141; 8,089,453; 8,120,836; 8,159,636; 8,208,193; 8,237,892; 8,238,021; 8,362,488; 8,373,211; 8,389,381; 8,395,836; 8,437,069; 8,441,414; 8,456,589; 8,498,042; 8,514,168; 8,547,628; 8,576,162; 8,610,988; 8,714,780; 8,728,266; 8,743,077; 8,754,859; 8,797,258; 8,797,633; 8,797,636; 8,830,560; 8,891,155; 8,969,886; 9,147,364; 9,025,234; 9,025,238; 9,030,374; 9,140,952; 9,152,003; 9,152,004; 9,201,279; 9,223,164; 9,285,648; and 9,310,661; and U.S. Patent Applications Publication Nos. 2002/0060321; 2004/0008179; 2004/0085619; 2004/0105036; 2004/0112525; 2005/0122306; 2005/0122563; 2006/0215106; 2006/0255322; 2007/0052757; 2007/0097489; 2007/0109219; 2008/0061300; 2008/0149271; 2009/0122389; 2009/0315044; 2010/0177396; 2011/0140744; 2011/0187683; 2011/0187689; 2011/0292319; 2013/0250397; 2013/0278900; 2014/0078024; 2014/0139501; 2014/0192000; 2014/0210701; 2014/0300837; 2014/0368753; 2014/0376164; 2015/0171112; 2015/0205178; 2015/0226986; 2015/0227018; 2015/0228666; 2015/0261057; 2015/0356927; 2015/0378235; 2016/077375; 2016/0103380; and 2016/0187759; and International Application Publication No. WO 00/38000; European Pat. Nos. 1,099,207 B1 and 1,145,072 B1;

(g) Color formation and color adjustment; see for example U.S. Pat. Nos. 7,075,502 and 7,839,564;

(h) Methods for driving displays; see for example U.S. Pat. Nos. 7,012,600 and 7,453,445;

(i) Applications of displays; see for example U.S. Pat. Nos. 7,312,784 and 8,009,348;

(j) Non-electrophoretic displays, as described in U.S. Pat. No. 6,241,921; and U.S. Patent Applications Publication No. 2015/0277160; and U.S. Patent Application Publications Nos. 2015/0005720 and 2016/0012710.

All of the above patents and patent applications are incorporated herein by reference in their entireties.

Many of the aforementioned patents and applications recognize that the walls surrounding the discrete microcapsules in an encapsulated electrophoretic medium could be replaced by a continuous phase, thus producing a so-called polymer-dispersed electrophoretic display in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating, dip coating; spray coating, meniscus coating; spin coating; brush coating; air knife coating, silk screen printing processes; electrostatic printing processes; thermal printing processes; inkjet printing processes; and other similar techniques.) Thus, the resulting display can be flexible. Further, because the display medium can be printed (using a variety of methods), the display itself can be made inexpensively.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published U.S. Application No. 2002/0075556, both assigned to Sipix Imaging, Inc.

The aforementioned types of electro-optic displays are bistable and are typically used in a reflective mode, although as described in certain of the aforementioned patents and applications, such displays may be operated in a "shutter mode" in which the electro-optic medium is used to modulate the transmission of light, so that the display operates in a transmissive mode. Liquid crystals, including polymer-dispersed liquid crystals, are, of course, also electro-optic media, but are typically not bistable and operate in a transmissive mode. Certain embodiments of the invention described below are confined to use with reflective displays, while others may be used with both reflective and transmissive displays, including conventional liquid crystal displays.

Whether a display is reflective or transmissive, and whether or not the electro-optic medium used is bistable, to obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a voltage such as to ensure that all the transistors in the selected row are conductive, while there is applied to all other rows a voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed to that the next line of the display is written. This process is repeated so that the entire display is written in a row-by-row manner.

Processes for manufacturing active matrix displays are well established. Thin-film transistors, for example, can be fabricated using various deposition and photolithography techniques. A transistor includes a gate electrode, an insulating dielectric layer, a semiconductor layer and source and drain electrodes. Application of a voltage to the gate electrode provides an electric field across the dielectric layer, which dramatically increases the source-to-drain conductivity of the semiconductor layer. This change permits electrical conduction between the source and the drain electrodes. Typically, the gate electrode, the source electrode, and the drain electrode are patterned. In general, the semiconductor layer is also patterned in order to minimize stray conduction (i.e., crosstalk) between neighboring circuit elements.

Liquid crystal displays commonly employ amorphous silicon ("a-Si"), thin-film transistors ("TFTs") as switching devices for display pixels. Such TFTs typically have a bottom-gate configuration. Within one pixel, a thin film capacitor typically holds a charge transferred by the switching TFT. Electrophoretic displays can use similar TFTs with capacitors, although the function of the capacitors differs somewhat from those in liquid crystal displays; see the aforementioned copending Application Ser. No. 09/565,413, and Publications 2002/0106847 and 2002/0060321. Thin film transistors can be fabricated to provide high performance. Fabrication processes, however, can result in significant cost.

In TFT addressing arrays, pixel electrodes are charged via the TFT's during a line address time. During the line address time, a TFT is switched to a conducting state by changing an applied gate voltage. For example, for an n-type TFT, a gate voltage is switched to a "high" state to switch the TFT into a conducting state.

Furthermore, unwanted effect such as voltage shifts may be caused by crosstalk occurring between a data line supplying driving waveforms to the display pixel and the pixel electrode. Similar to the voltage shift described above, crosstalk between the data line and the pixel electrode can be caused by capacitive coupling between the two even when the display pixel is not being addressed (e.g., associated pixel TFT in depletion). Such crosstalk can result in voltage shifts that are undesirable because it can lead to optical artifacts such as image streaking.

Figure 1:
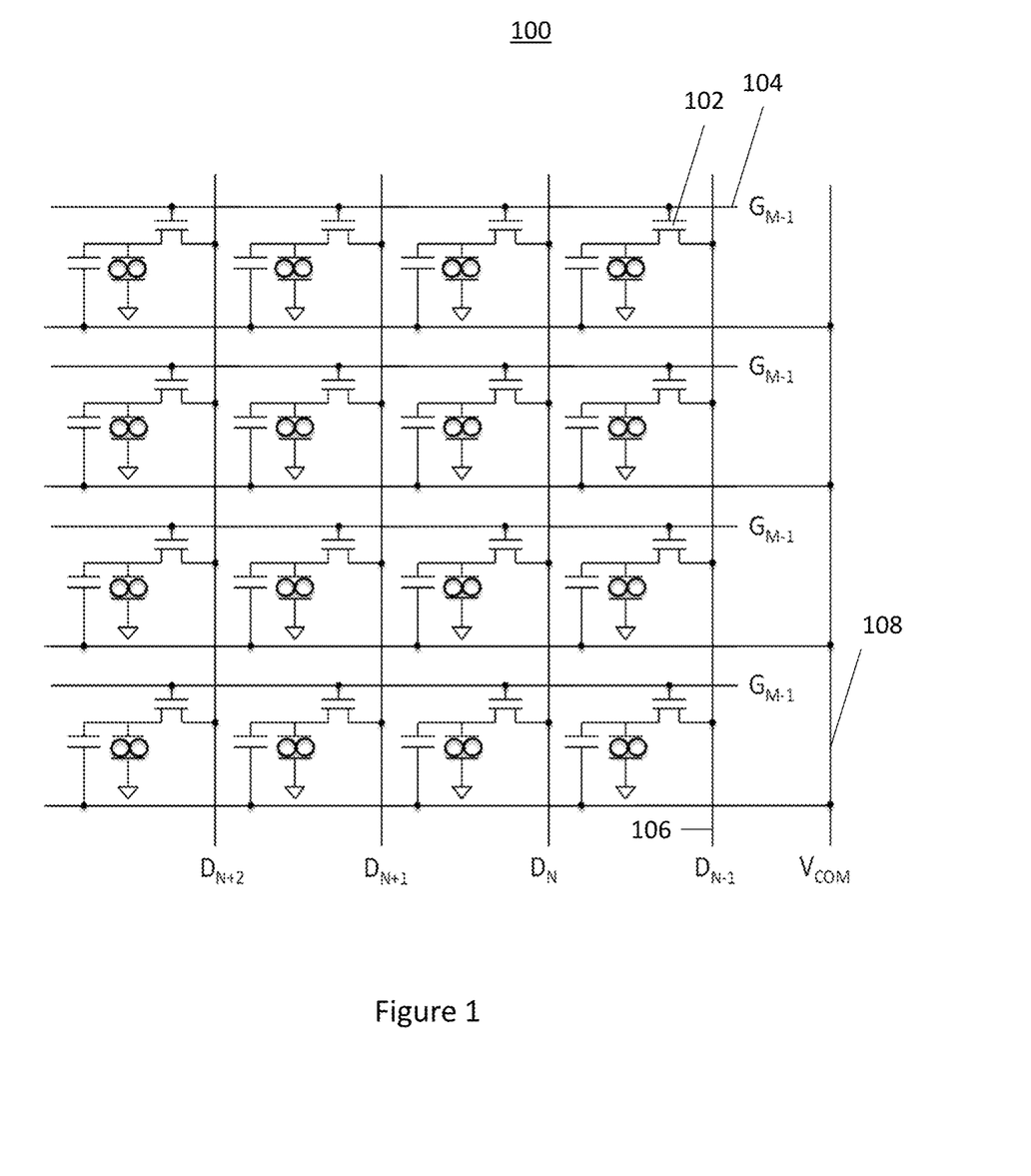
FIG. 1 illustrates a backplane circuit in accordance with the subject matter disclosed herein.

In some embodiments, an electrophoretic display or EPD 100 may include two substrates (e.g., plastic or glass) where a front plane laminate or FPL is positioned between the two substrates. In some embodiments, the bottom portion of the top substrate may be coated with a transparent conductive material to function as a conductive electrode (i.e., the $V_{com}$ plane). The top portion of the lower substrate may include an array of electrode elements (e.g., conductive electrodes for each display pixels). A semiconductor switch, such as a thin film transistor or TFT, may be associated with each of these pixel electrodes. Application of a bias voltage to a pixel electrode and the $V_{com}$ plane may result in an electro-optical transformation of the FPL. This optical transformation can be used as a basis for the display of text or graphical information on the EPD. To display a desired image, a proper voltage needs to be applied to each pixel electrode. To achieve that, each TFT 102 may be provided with a gate line signal, a data line signal, $V_{com}$ line signal and a storage capacitor. In one embodiment, as illustrated in FIG. 1, the gate of each TFT 102 may be electrically coupled to a scan line 104, and the source or drain of the transistor may be connected to a data line 106, and the two terminals of the storage capacitor may be connected to a $V_{com}$ line 108 and pixel the pixel electrode, respectively. In some embodiments, the $V_{com}$ on the bottom portion of the top substrate and the $V_{com}$ line grid on the top portion of the bottom substrate may be connected to the same DC source.

EPD Operation and Crosstalk

In operation, driving signals (e.g., voltage pulses) are applied to each data lines for updating the display pixels. To select which display pixels to be updated, the scan lines (e.g., scan line 104) may be selectively activated so that the driving signals from the data lines (e.g., data line 106) may be applied to the pixel electrodes to update the corresponding display pixels. In some embodiments, each scan line may be activated sequentially until all the display pixels of the EPD 100 are updated. In this updating process, the $V_{com}$ signal could be disturbed or deviated from an intended level by undesired capacitance coupling effects.

Figure 2:
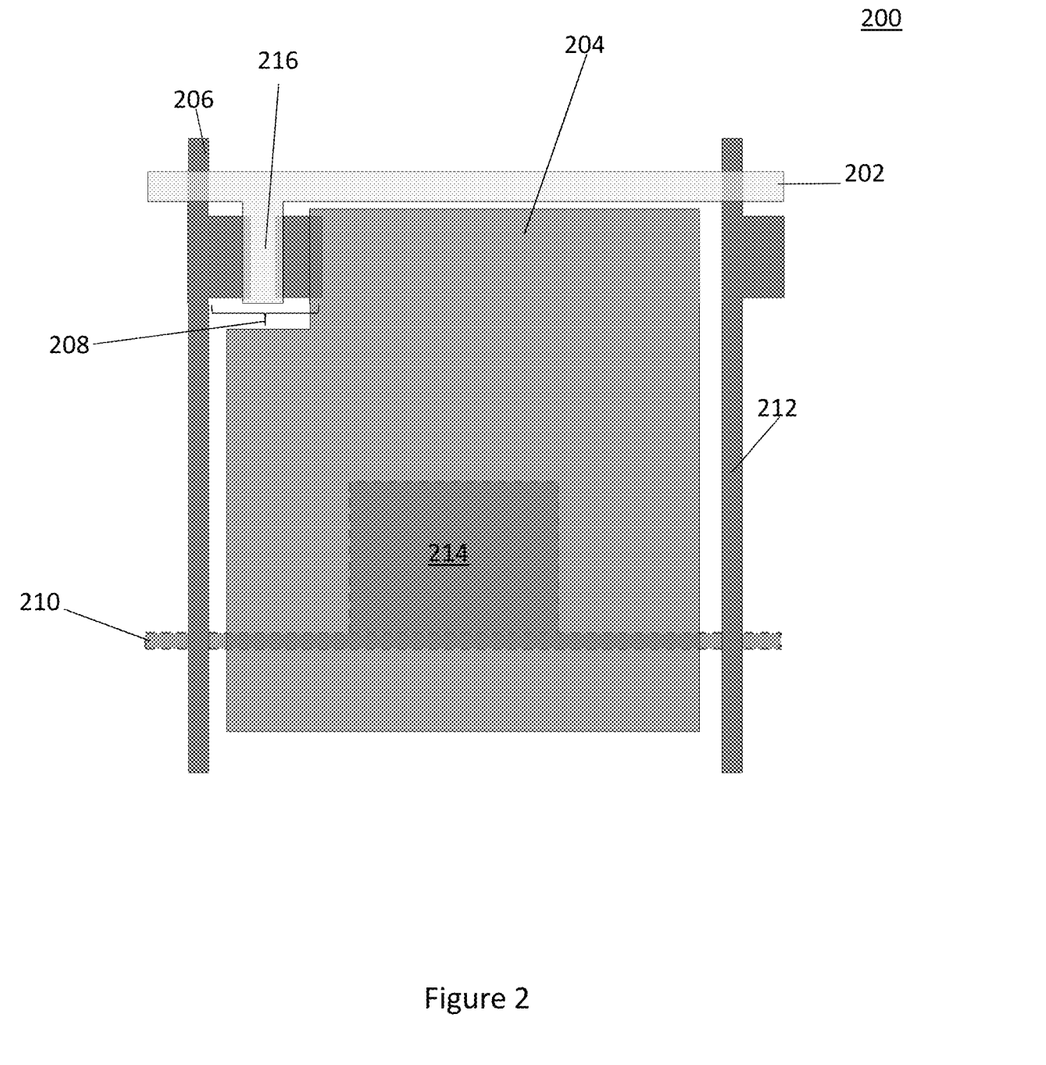
FIG. 2 illustrates a top view of a display pixel in accordance with the subject matter disclosed herein.

FIG. 2 illustrates a top view of a display pixel 200 in accordance with the subject matter disclosed herein. The display pixel 200 includes a pixel electrode 204 configured to drive the display pixel. In use, the display pixel 200 will be driven by a series of voltage pulses induced onto the pixel electrode 204. The series of voltage pulses may be applied to the pixel electrode 204 through a transistor 208. The transistor 208 can function as a switch, switching on and off the signal path leading to the pixel electrode 204. For example, the gate 216 of the transistor 208 may be connected to a signal selecting gate line 202. In use, this gate 202 can be used to selectively turning on and off the transistor 208 by applying or not applying a voltage to the transistor's 208 gate 216. Furthermore, the series of voltage pulses may be supplied through a data line 206. This data line 206 is also electrically coupled to the transistor 208, as illustrated in FIG. 2. In operation, a signal (e.g., electrical pulse) can be transmitted through the gate line 202 to activate or turn-on the transistor 208, and once the transistor 208 is turned on, electrical signals applied through the data line 206 can be transmitted to the pixel electrode 204 through the transistor 208. Also presented in FIG. 2 is a $V_{com}$ line 210. In some embodiments, this $V_{com}$ line 210 may be electrically coupled to a top electrode (not shown here in FIG. 2) of the display to keep the top electrode at a constant voltage level (e.g., $V_{com}$). Normally this $V_{com}$ line 210 is at a device level positioned below the pixel electrode 204. Also connected to this $V_{com}$ line 210 is an electrode 214 of a storage capacitor, where the electrode 214 may be positioned on the same device layer as the $V_{com}$ line 210.

Figures 3A, 3B:
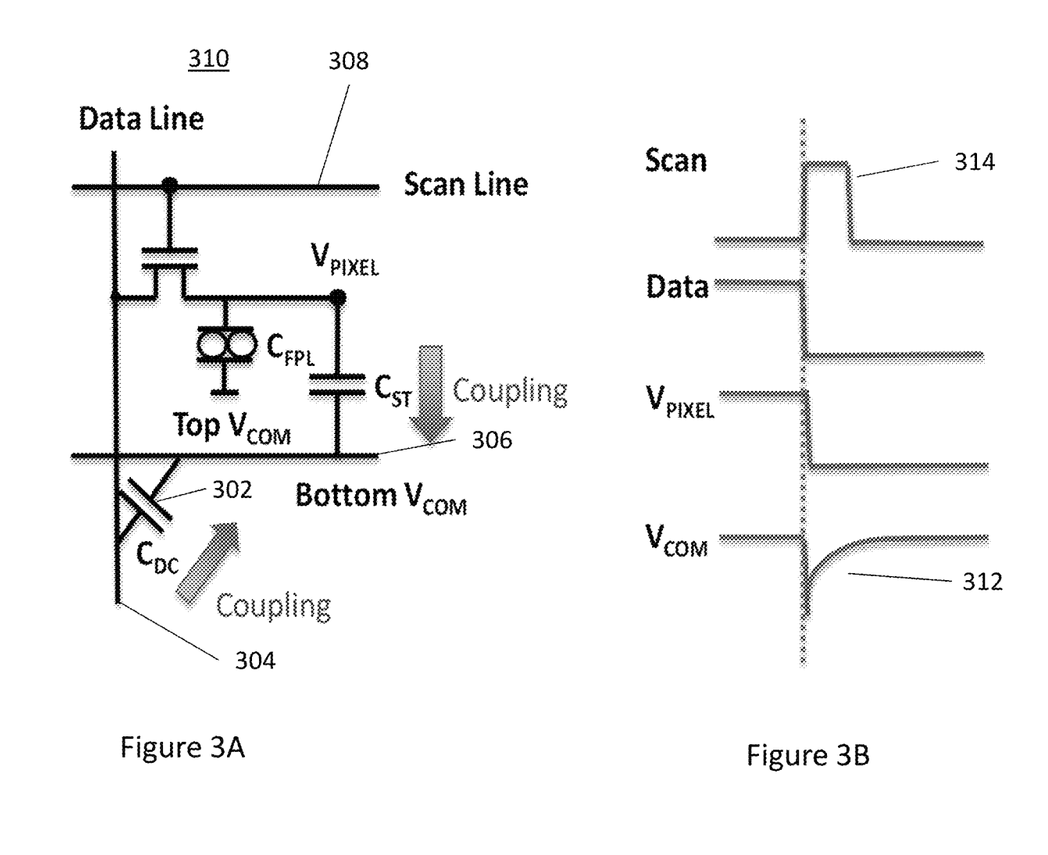
FIG. 3A illustrates an embodiment of an equivalent circuit of a display pixel in accordance with the subject matter disclosed herein.
FIG. 3B illustrates a sample driving scheme in accordance with the subject matter presented herein.

Referring now to FIG. 3A, among the sources of capacitance couplings, one possible source may be the capacitance between the data line 304 and the $V_{com}$ line 306 (i.e., $C_{DC}$ 302). For example, as voltage signals are applied through the data line 304, the change in voltage levels in the data line 304 may give rise to a capacitive coupling effect between the data line 304 and the $V_{com}$ line 306. Another possible source of capacitive coupling may occur between the electrode of the storage capacitor and the pixel electrode.

In operation, the $V_{com}$ voltage value may experience a fluctuation (e.g., a dip in voltage value) when a display pixel is selected (i.e., scan line 308 selects the pixel 310), and driving voltage signals are applied through the data line 304, thereby causing changes in voltage values at the data line 304. In this case, affected by some of the above mentioned capacitive effects, the $V_{com}$ voltage value may deviate from a target value (e.g., +15, −15, or 0V). If the $V_{com}$ is not able to return to this target voltage value when the scan line 308 is turned off (i.e., putting the selected display pixel in a floating state). As a result, the voltage level of the selected pixel electrode will shift from the target value roughly to the amount estimated below, which can lead to an observable band along $V_{com}$ line direction. The shift of pixel voltage ($\Delta V_{PIXEL}$) may be calculated using the principle of charge conservation:

$$\Delta V_{PIXEL} = \frac{C_{ST} \cdot \Delta V_{COM}}{C_{total}}$$

Where $\Delta V_{COM}$ is the resulting voltage shift in $V_{com}$ value when a scan line is turned off, $C_{total}$ is the total capacitance of pixel electrode, and $C_{total}$ may include, in addition to the capacitance coupling effects mentioned above, also capacitance coupling effects that may arise between any of the metal layers and material layers.

This shift of pixel voltage ($\Delta V_{PIXEL}$) may sometimes be referred to as crosstalk or streaking. One way to mitigate these unwanted effects may be to decrease the RC delay of $V_{com}$ signal to ensure that the $V_{com}$ value returns to the targeted value or level during the activation of the scan line. FIG. 3B illustrates the $V_{com}$ voltage 312 going through a dip as the Scan voltage 314, which turns on the pixel, goes high (i.e., turning on the pixel 310).

Figure 4A:
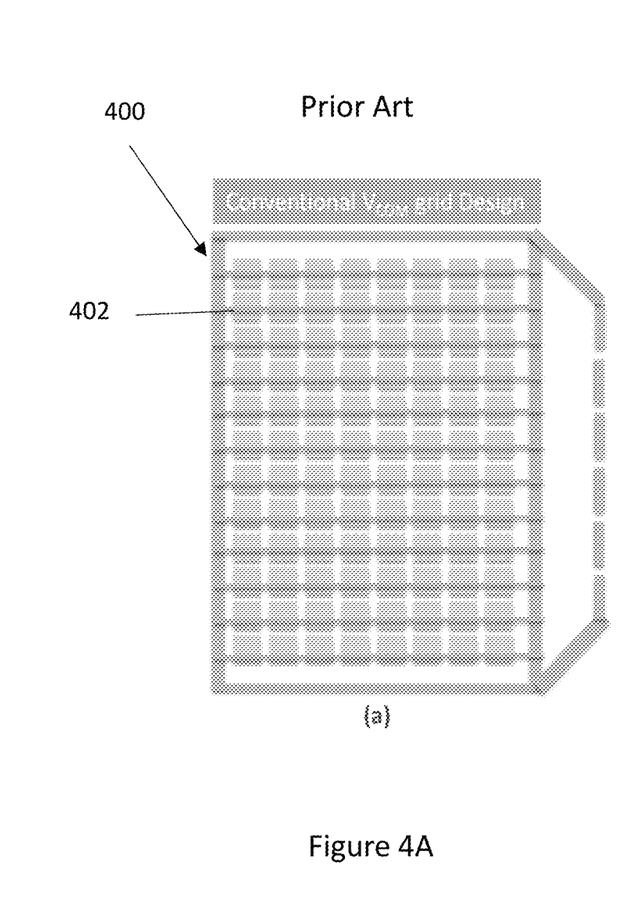
FIG. 4A illustrates a backplane circuit in accordance with the subject matter presented herein.
Figure 4B:
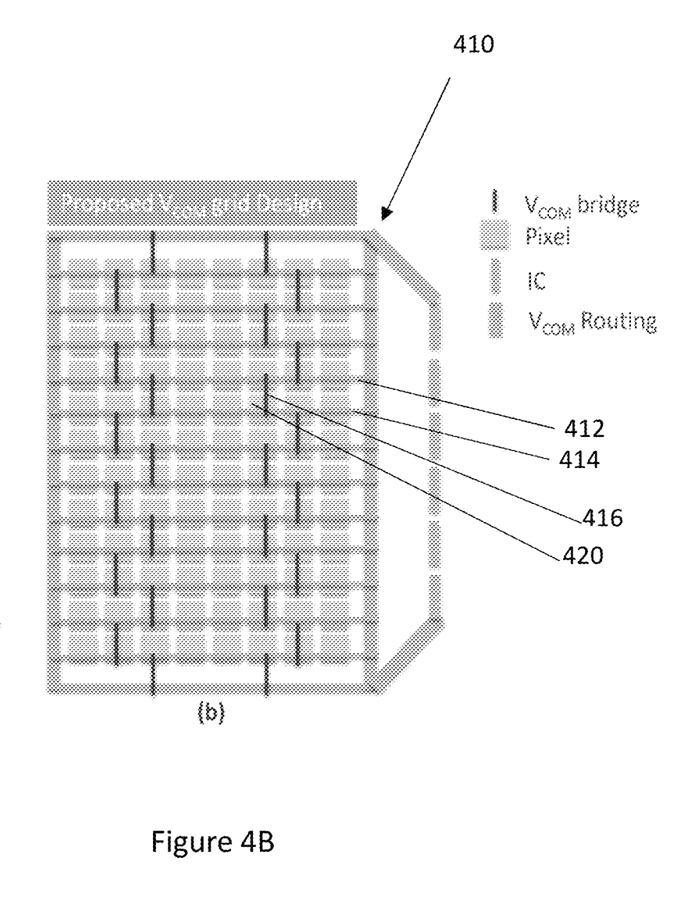
FIG. 4B illustrates another backplane circuit in accordance with the subject matter presented herein.

For reducing the RC delay mentioned above to ensure a fast V level recovery, a new design of a display backplane is presented in FIG. 4B. But firstly, referring to FIG. 4A, where a conventional backplane 400 is presented. As illustrated in FIG. 4a, each rows of display pixel is biased by a $V_{COM}$ line 402, through which the VdCOM voltage is applied to each pixel. It is shown in FIG. 4A that $V_{COM}$ signal lines for each row are independent from one another. In this configuration, when the $V_{COM}$ value is affected or shifted by the capacitive coupling effects caused by the storage capacitors and the data lines (i.e., $C_{DC}$), the $V_{COM}$ value can recover only through voltages applied at the two ends of the pixel array, which may not be sufficiently fast enough.

Referring now to FIG. 4B, in a design 410 in accordance with the subject matter presented herein, one $V_{COM}$ line 412 may be electrically coupled to another $V_{COM}$ line 414 from an adjacent row using a conductive path 416, where the conductive math 416 may be constructed using a material conventionally used in the art to construct an electric conduction line (e.g., copper, gold, etc.). In this configuration, $V_{COM}$ current can now reach the pixel area from four sides of pixel array, leading to a reduced RC delay, which results in a faster $V_{COM}$ recovery time.

In practice, an EPD may have two adjacent rows of display pixels, where each row may include a plurality of display pixels, and each display pixel having a pixel electrode for driving the display pixel. And each row may also have a first signal line connected to each of the pixel electrodes of the plurality of display pixels, and at least one conductive path connecting the first signal line of the first row to a second signal line of the second row of display pixels. Or as illustrated in FIG. 4B, more than 1, for example, 2 or 3 or 4 such conduction paths between the adjacent rows of display pixels.

In another embodiment, as described in FIG. 2 above, an EPD may have spaced first and second device layers, and a first and second rows of display pixels, where each row can have a plurality of display pixels, and each display pixel having a pixel electrode positioned on the first device layer for driving the display pixel. Furthermore, a signal line positioned on the second device layer and overlapping with a portion of the plurality of display pixels' pixel electrodes, and at least one conductive path connecting the signal line of the first row to a signal line of the second row of display pixels.

Figure 5A:
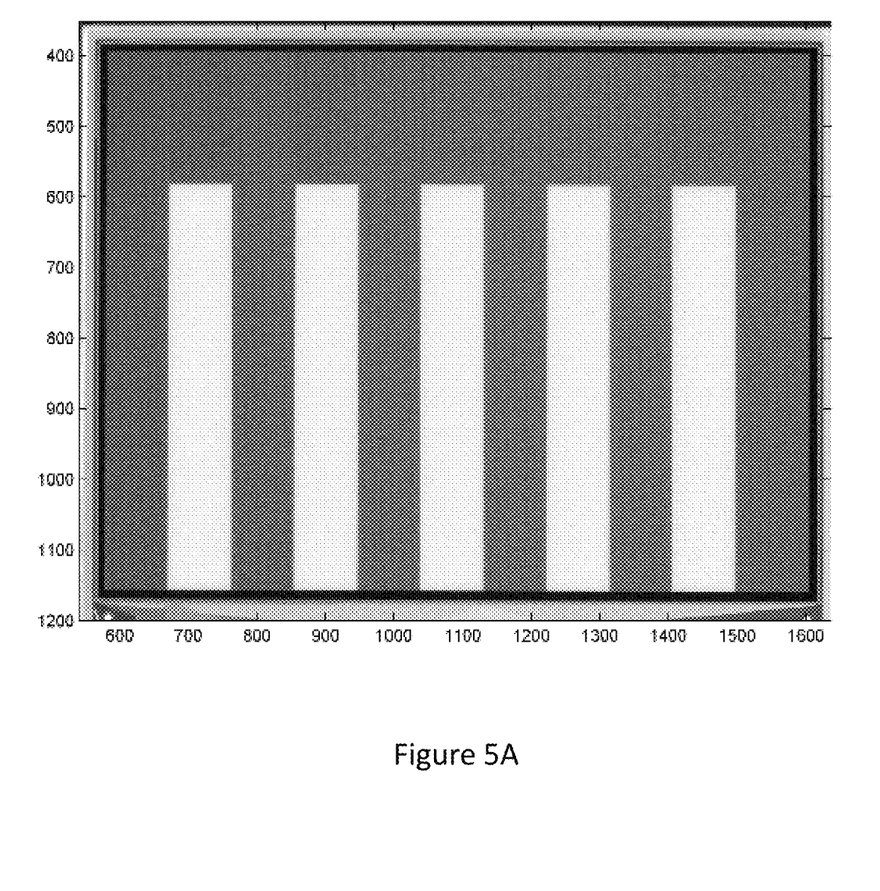
FIG. 5A illustrates a display image with crosstalk in accordance with the subject matter presented herein.
Figure 5B:
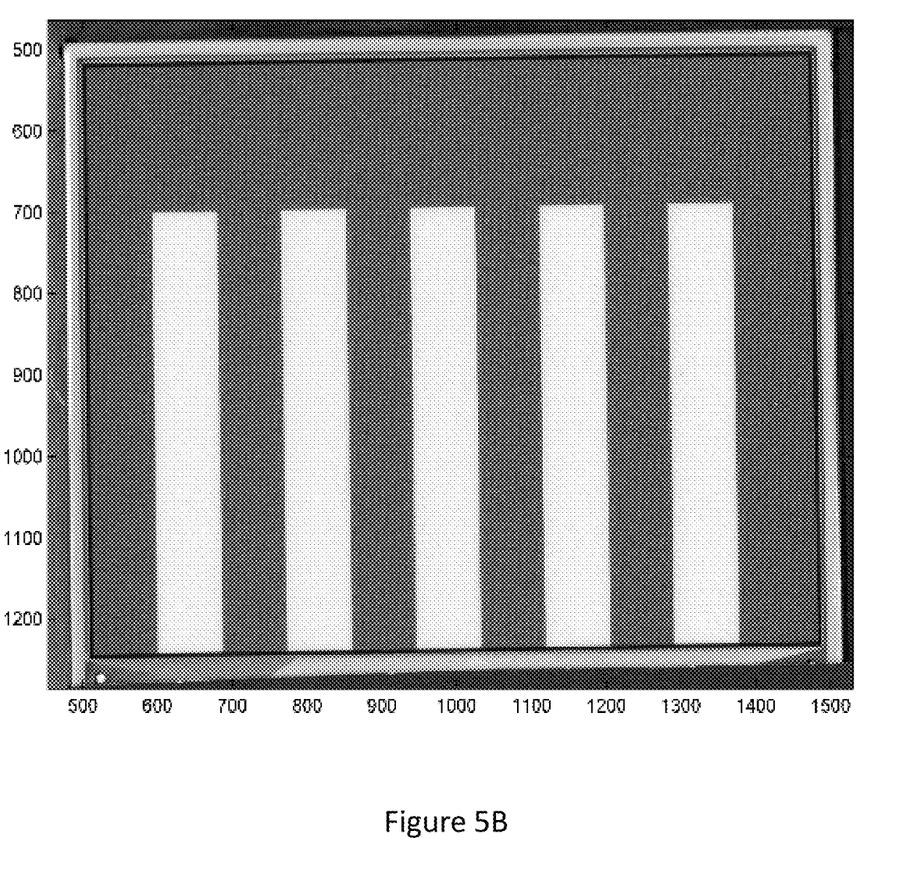
FIG. 5B illustrates a display image with reduced crosstalk using the subject matter presented herein.

FIG. 5a illustrates an image displayed using a backplane illustrated in FIG. 4a, where crosstalk effect is present. In comparison, FIG. 5b illustrates an image using a backplane described in FIG. 4b, where crosstalk effect is reduced.

From the foregoing, it will be seen that the present invention can provide a backplane for reducing cross-talks and display pixel voltage shifts. It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An electro-optic display comprising:
    a first row of display pixels and a second row of display pixels, each row of display pixels comprising:
        a plurality of display pixels, each display pixel having a pixel electrode for driving the display pixel;
        a signal line connected to each of the pixel electrodes of the plurality of display pixels;
        a data line connected to each of the plurality of display pixels and configured to supply driving signals to each of the plurality of display pixels, the data line forms a first capacitance with the signal line; and
        each of the pixel electrodes of the plurality of display pixels connected to a storage capacitor, the storage capacitor forms a second capacitance with each of the pixel electrodes of the plurality of display pixels; and
    at least one conductive path connecting the signal line of the first row of display pixels to the signal line of the second row of display pixels, configured to reduce a crosstalk produced by the first capacitance and the second capacitance.

2. The electro-optic display of claim 1 wherein the signal line is configured to transmit a constant voltage to the pixel electrodes of the plurality of display pixels.

3. The electro-optic display of claim 1 wherein each row of display pixels further comprises a capacitor connected to the signal line.

4. The electro-optic display of claim 1 further comprising a layer of electro-optic material configured to drive the electro-optic material to display images.

5. The electro-optic display of claim 4, wherein the electro-optic material comprises a rotating bichromal member or electrochromic material.

6. The electro-optic display according to claim 5 wherein the electro-optic material comprises an electrophoretic material comprising a plurality of electrically charged particles disposed in a fluid and capable of moving through the fluid under the influence of an electric field.

7. The electro-optic display according to claim 6 wherein the electrically charged particles and the fluid are confined within a plurality of capsules or microcells.

8. The electro-optic display according to claim 7 wherein the electrically charged particles and the fluid are present as a plurality of discrete droplets surrounded by a continuous phase comprising a polymeric material.

9. The electro-optic display according to claim 8 wherein the fluid is gaseous.

10. The electro-optic display of claim 1 wherein the signal line of the first row of display pixels and the signal line of the second row of display pixels are independent from one another.

11. The electro-optic display of claim 1 wherein the signal line of the first row of display pixels and the signal line of the second row of display pixels are configured to be connected to a voltage source.

12. The electro-optic display of claim 11 wherein the at least one conductive path connecting the signal line of the first row of display pixels to the signal line of the second row of display pixels is independent from a connection to the voltage source.

* * * * *